March 29, 1949.  C. D. WILSON  2,465,412

SENSITIZING DYES CONTAINING STYRYL DYE NUCLEI

Filed April 28, 1945

SILVER BROMIDE EMULSIONS

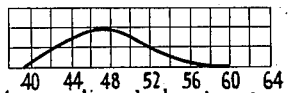
Hexamethylene(2 p-dimethylaminostyryl-benzothiazole) dibromide

Fig. 1

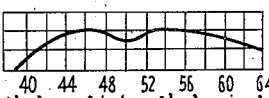
N-N' ethylene-bis(p-ethylaminobenzo-thiazole ethiodide

Fig. 5

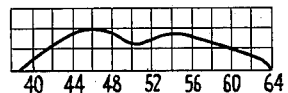
N-N' diethylene bis(2 aminostyrylbenzo-thiazole ethiodide)

Fig. 2

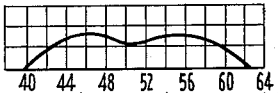
Dye from hexamethylene bis(2-6 lutidine) dibromide and p-dimethylaminobenzaldehyde

Fig. 7

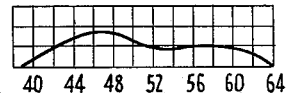
N-N' diethylene bis(2 p-aminostyryl-benzoselenazole ethiodide)

Fig. 3

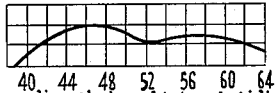
Dye from dimethylene bis(2-4 lutidine) dibromide and p-dimethylaminobenzaldehyde

Fig. 8

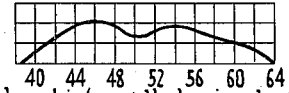
N-N' ethylene bis(p-methylaminostyryl-benzothiazole ethiodide)

Fig. 4

SILVER CHLORIDE EMULSIONS

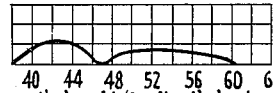
Hexamethylene bis(2 p-dimethylaminostyryl-benzothiazole) dibromide

Fig. 1A

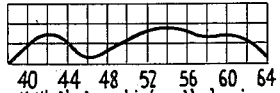
N-N' ethylene bis(p-ethylamino-benzothiazole ethiodide)

Fig. 5A

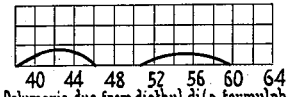
Polymeric dye from diethyl di(p-formylphenyl) ethylene diamine and hexamethylene bis(2-methylbenzothiazole) dibromide

Fig. 6A

INVENTOR.
*Cyril Donovan Wilson*
BY
*Lynn Barratt Morris*
ATTORNEY

Patented Mar. 29, 1949

2,465,412

UNITED STATES PATENT OFFICE 2,465,412

SENSITIZING DYES CONTAINING STYRYL DYE NUCLEI

Cyril D. Wilson, Metuchen, N. J., assignor to E. I. du Pont de Nemours & Company, Wilmington, Del., a corporation of Delaware Application April 28, 1945, Serial No. 590,840

15 Claims. (Cl. 260—240)

This invention relates to dyes and more particularly to photo-sensitizing dyes. Still more particularly it pertains to sensitizing dyes which contain two or more styryl dye nuclei per molecule. The invention also pertains to photographic emulsions sensitized with such dyes and to processes of preparing the dyes and compositions.

An object of this invention is to provide improvements in the art of sensitizing dyes. Another object is to provide improvements in the art of photography. A further object is to provide a new class of styryl dyes. A still further object is to provide new means or materials for sensitizing photo-sensitive salts. A still further object is to provide new or substitute materials for conferring an extra range of spectral sensitivity to silver halide emulsions. Another object is to provide a new class of sensitizing dyes which can be used in processes of black and white or color photography. Yet another object is to provide a new class of bis-styryl dyes and of polymeric styryl dyes. A further object is to provide practical methods for preparing such dyes.

a cycloammonium salt containing at least one reactive methyl group in the alpha or gamma position to the heterocyclic nitrogen atom, at least one of the reactants containing two of such groups. The condensation may advantageously be carried out in the presence of an acid binding agent or base, especially organic amines having a dissociation constant greater than pyridine, such as ethylamine, diethylamine, piperidine, diethylcyclohexylamine, etc.

Among the various general types of procedure are the following:

1. A para-tertiary amino aromatic aldehyde having two or three aldehyde groups in positions para to tertiary amine groups may be condensed with a mono-quaternary salt of a heterocyclic nitrogen compound containing a reactive methyl group in the alpha or gamma position to the hetero-nitrogen atom. The latter salt should be present in an amount sufficient to combine with each aldehyde group. This procedure results in dimeric and trimeric styryl dyes. It is exemplified by the following equation with representative reactants:

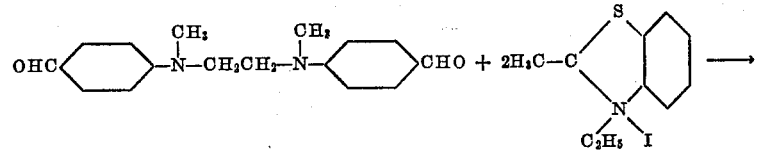
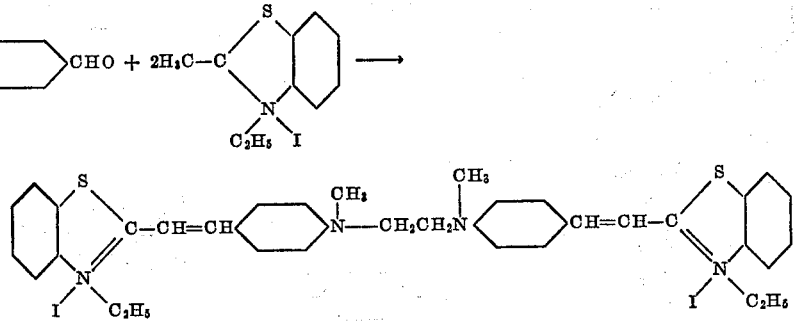

Other objects will be apparent to those skilled in the art from the following description of the invention.

It has been discovered that novel styryl dyes which contain more than one complete styryl dye nucleus can be made by condensing (1) a para-tertiary-amino aromatic aldehyde containing at least one reactive aldehyde group with (2)

2. One mol of an alkylene bis-quaternary salt of a heterocyclic nitrogen compound having a reactive methyl group in the alpha or gamma position to the heterocyclic nitrogen atom may be reacted with two mols of a tertiaryamino aromatic aldehyde containing a single reactive group. Dimeric styryl dyes are formed by this procedure. Acid binding agents or solvents may advantageously be used. The reaction is exemplified by the following equation:

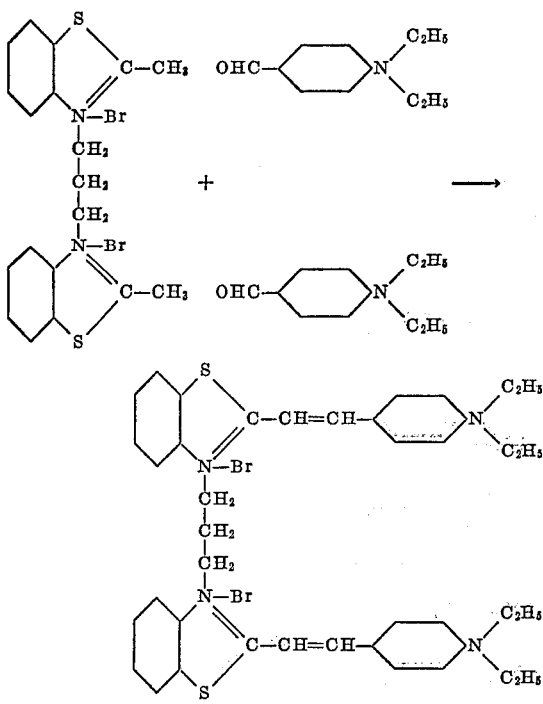

A class of dyes as set forth in claim 9 can be made by substituting other azole salts and other dialkyl-amino aldehydes.

3. A tertiary aromatic amine having two or more aldehyde groups is reacted with a bis-quaternary salt of a heterocyclic nitrogen compound which contains a reactive methyl group in the alpha or gamma position to the hetero-nitrogen atom, in the presence of an acid binding agent. This aspect is illustrated by the following equation:

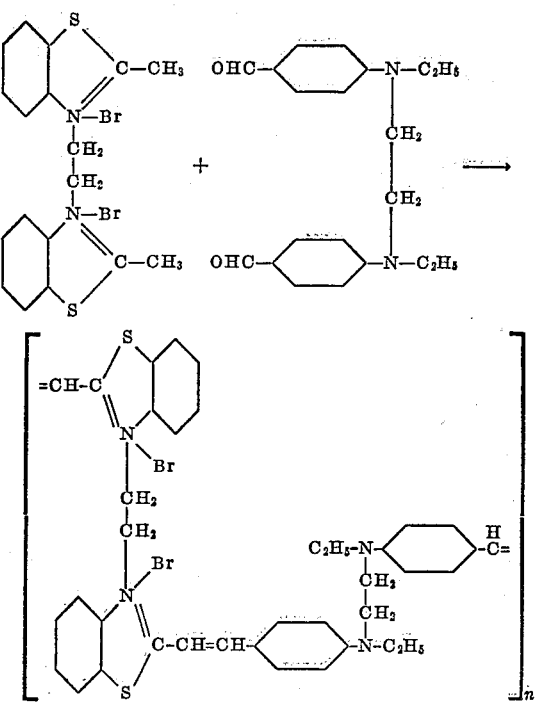

A class of dyes having the following general formula can be made by substituting other azole salts and bialdehydes

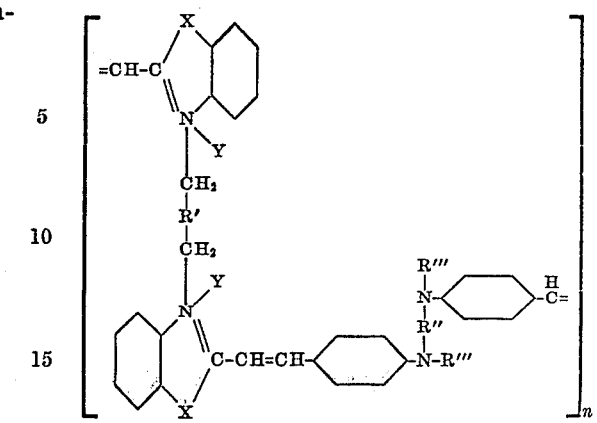

wherein X is a member of the group consisting of oxygen, sulfur and selenium, Y is the negative radical of an acid, R' is a hydrocarbon radical, R'' is a divalent hydrocarbon radical and R''' is an alkyl radical and $n$ is a positive integer which represents the number of recurring radicals in the polymeric dye.

4. Two mols of a tertiary amino aromatic aldehyde containing a single aldehyde group is reacted with a mole of a bis-quaternary salt of a heterocyclic nitrogen salt having at least two reactive methyl groups in the alpha or gamma position to a heterocyclic nitrogen atom or atoms, in the presence of an acid binding solvent. This embodiment of the invention is illustrated by the following equation:

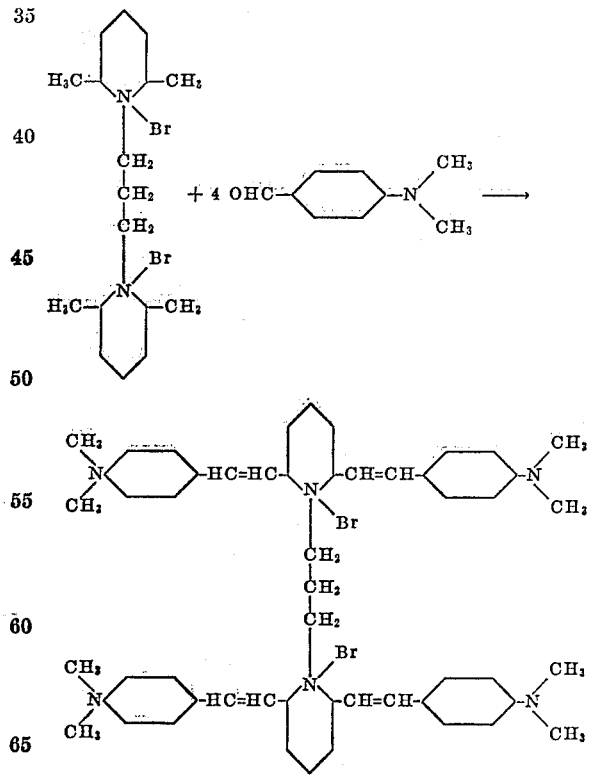

The bis-, tris-, heterocyclic (or cyclo-ammonium) salts used in accordance with the teaching of this invention can be made after the manner set forth in application Serial No. 409,433, filed September 3, 1941, now Patent Number 2,425,772, August 19, 1947, of which this present application is a continuation-in-part. It comprises reacting a heterocyclic nitrogen base containing in the alpha or gamma position to the heterocyclic nitrogen atom a reactive group which can be used in cyanine dye condensations, such as alpha methyl benzothiazole or alpha methylmercapto quinoline, with a poly-functional organic compound containing a plurality of functional groups each of which is capable of forming quaternary ammonium salts with ternary nitrogen compounds.

The poly-heterocyclic quaternary or poly-cycloammonium salts formed in the case of the bissalts have the general formula:

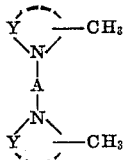

wherein A is a bivalent hydrocarbon radical joined to N through aliphatic carbon, Y constitutes the atoms necessary to complete a heterocyclic nitrogen nucleus of the type contained in cyanine dyes, and the nitrogen atoms (N) are pentavalent and have attached thereto an acid radical. For instance Y may constitute the atoms necessary to complete an azole radical such as a thiazole, oxazole, selenazole, iminazole, indolenine, dialkylindolenine, or pyridine radical including those having fused carbocyclic rings, e. g., benzothiazoles, quinolines, etc.

A number of suitable aldehydes are well-known in the prior art. Such aldehydes can be prepared after the manner described in my copending application Serial No. 581,939, filed March 9, 1945, now Patent Number 2,437,370, March 9, 1948. This process comprises reacting a tertiary aromatic amine having at least one benzene ring attached to an amino nitrogen atom with a dialkylformamide, in the presence of a chloride or oxychloride of sulfur or phosphorus. Each of the aldehydes described in that application may be used as reactants in the appropriate processes of this invention.

The dyes are useful in the preparation of photographic silver halide emulsions and modify their spectral sensitivity. They are not limited in their use to any partcular type of silver salt, but actually can be used with simple and mixed silver halide emulsions and mixed emulsions in general. They have utility in silver chloride, silver bromide, silver-chloride-bromide, silver-bromide-iodide, silver-chloride-bromide-iodide, etc., emulsions. They are also useful in mixed emulsions, for instance, those having the proportion of 25% chloride emulsions to 75% chloro-bromide emulsion to 75% chloride emulsion to 25% chlorobromide emulsion. The dyes can be added to one or more of such emulsions prior to mixing.

In the preparation of photographic emulsions containing such novel dyes, it is necessary only to bring the dye into intimate contact with the light-sensitive silver salt grains whereby they become dyed or absorb or adsorb the dye. This can be accomplished by dispersing the compounds in the emulsions before coating the light-sensitive layers or afterwards by bathing or impregnating the layer with the polymeric dyes. It is convenient to add the dyes to the emulsions in the form of solutions in appropriate solvents. The solvent must, of course, be compatible with the emulsion, substantially free from any deleterious effect on the light-sensitive materials in the emulsions and capable of dissolving the dyes. Methanol is a satisfactory solvent for the new dyes. Acetone can be employed. The dyes are advantageously incorporated in the finished washed emulsions and should be uniformly distributed throughout the emulsions.

The concentration of the new dyes in the emulsions can vary widely, e. g., from about 2 to 100 mg. per liter of ordinary flowable gelatino-silver-halide emulsion. The concentration of dye will vary according to the type of light-sensitive materials employed in the emulsion and according to the effects desired. The suitable and most economical concentration for any given emulsion will be apparent to those skilled in the art, upon making ordinary tests and observations customarily employed in the art of emulsion making. To prepare a gelatino-silver-halide emulsion, the following procedure is satisfactory:

A quantity of the dye is dissolved in methyl alcohol or acetone and a volume of this solution (which may be diluted with water) containing from 2 to 100 mg. of dye is slowly added to 100 cc. of a flowable gelatino-silver-halide emulsion with stirring. Stirring is continued until the dye is thoroughly incorporated in the emulsion. Ordinarily from 10 to 20 mgs. of our new dyes per liter of emulsion suffice to produce the maximum sensitizing effect.

The invention will be more fully illustrated but is not intended to be limited by the following examples:

*Procedure A*

Nine and eight-tenths parts of hexamethylenebromide and 14 parts of 2-methylbenzothiazole were heated together on a steam bath under reflux for four days. The solid obtained was dissolved in a small amount of water, the water solution was washed thoroughly with ether, and the solid was reprecipitated from the water solution by adding a large excess of acetone. The solid, namely hexamethylene-bis-(2-methylbenzothiazole bromide), obtained was filtered out, washed with acetone, and dried in a vacuum desiccator. Upon analysis for bromine it was found to contain 29.42% as compared with the theoretical of 29.5%.

*Procedure B*

Twenty-one and four-tenths parts (1 mole) of 2,6-lutidine and 24.4 parts (1 mole) of hexamethylene bromide were heated together on a steam bath for 48 hours. The mixture was filtered out and washed thoroughly with ether. The washed solid, namely hexamethylene-bis-(2,6-lutidine) dibromide, was taken up in absolute alcohol, reprecipitated with ether, filtered, washed with ether, and dried in a vacuum desiccator. Upon analysis for bromine it was found to contain 34.6% as compared with a theoretical of 34.9%.

*Procedure C*

Twenty-one and four-tenths parts (1 mole) of 2,4-lutidine and 20.2 parts (1 mole) of trimethylene bromide were heated together on a steam bath for one week. The mixture was about half solid. Continued heating gave no increase in solid. The solid, namely trimethylene-bis-(2,4-lutidine) dibromide, was filtered out and treated as in Procedure B above. Upon anaylsis for bromine it was found to contain 38.3% as compared with a theoretical of 38.5%.

*Example I*

Two parts of hexamethylene-bis-(2-methylbenzothiazole) dibromide was mixed with 1.1 parts of p-dimethylaminobenzaldehyde in 50 cc.

of alcohol, and the mixture was heated to boiling. Two drops of piperidine was added and the refluxing was continued for one hour. A deep red dye deposited. The dye, hexamethylene - bis - (2-p-dimethylaminostyrylbenzothiazole) dibromide, was extracted with 1.5 liters of alcohol in small portions. It was insoluble in alcohol, acetone, pyridine, acetic acid, and dioxan. It was somewhat soluble in water.

To 100 parts of a gelatino-silver-bromide emulsion containing 5 per cent of silver iodide were added 0.003 part of this dye and its spectral curve is shown in Fig. 1 of the accompanying drawing. In like manner 0.003 part of this dye were added 100 parts of a gelatino-silver-chloride emulsion. Its spectral sensitivity is shown in Figure 1a of the drawing.

*Example II*

One gram of N-N'-(p-p'diformyl-diphenyl) piperazine described in aforesaid application Serial No. 581,939, Example XII and 2.08 grams of 2-methylbenzothiazole ethiodide were dissolved in 50 cc. of boiling alcohol, 3 drops of piperidine was added and the mixture was refluxed for 1 hour. The mixture was then chilled in an ice bath, filtered, and the red dye, namely N,N' - diethylene - bis - (2 - p - aminostyrylbenzothiazole ethiodide), that formed was washed with diethyl ether. The dye was recrystallized from about two liters of alcohol.

Approximately 0.003 part of this dye in alcoholic solution were added to 100 parts of a gelatino-silver-bromide emulsion containing 5 parts of silver iodide. The spectograph of the emulsion is shown in Fig. 2 of the drawing.

*Example III*

One gram of N-N'-(p-p'-diformyl-diphenyl) piperazine and 2.4 grams of 2-methylbenzoselenazole ethiodide were dissolved in 50 cc. of boiling alcohol, 3 drops of piperidine were added, and the mixture was refluxed for one hour. The solution was chilled, filtered and the dye, namely N-N'-diethylene-bis-(2-p-aminostyrylbenzoselenazole ethiodide) that formed was recrystallized from about two liters of alcohol.

Approximately 0.003 part of this dye in alcoholic solution were added to 100 parts of gelatino-silver-bromide emulsion containing 5 parts of silver iodide. The spectograph of the emulsion is shown in Figure 3 of the drawing.

*Example IV*

One gram of N-N'-methylene-bis-(p-methylaminobenzaldehyde) and 2.17 grams of 2-methylbenzothiazole ethiodide were dissolved in 50 ccs. of alcohol, 3 drops of piperidine were added, and the solution was refluxed for one hour. The solution was evaporated down to about 20 ccs., chilled and filtered. The solid, namely methylene - bis - (p - methylaminostyrylbenzothiazole ethiodide) that formed was recrystallized twice from a small quantity of alcohol.

*Example V*

One gram of N,N'-ethylene-bis-(p-methylaminobenzaldehyde) and 2.5 grams of 2-methylbenzothiazole ethiodide were dissolved in 25 ccs. of ethyl alcohol and 3 drops of piperidine were added. The reaction was carried out and the deep purple dye of N,N'-ethylene-bis-(p-methylaminostyrylbenzothiazole ethiodide) was recovered in the same manner as described in Example IV. It was not very soluble in ethyl alcohol.

An alcoholic solution containing 0.002 part of this dye were added to 100 parts of a gelatino-silver-bromide emulsion containing 5 parts of silver iodide. The spectograph of the emulsion is shown in Figure 4 of the drawing.

*Example VII*

Methyl-p,p'-diformyldiphenylamine described in Example XIII of application Serial No. 581,-939 in an amount of one gram and 1.4 grams of 2-methylbenzothiazole ethiodide were dissolved in 50 ccs. of ethyl alcohol and 3 drops of piperidine were added. The reaction was carried out and methyl-di-(p-styrylbenzothiazole ethiodide)amine was recovered in the form of a deep red powder in the manner described in Example IV.

*Example VIII*

Two grams of N-N'-ethylene-bis-(p-ethylamino-benzaldehyde), prepared as described in Example X of application Serial No. 581,939 and 3.8 grams of 2-methylbenzothiazole ethiodide were dissolved in 50 ccs. of boiling alcohol and 3 drops of piperidine were added. The mixture was refluxed for 15 minutes. Dye began to deposit from the hot solution almost immediately. The mix was cooled and filtered. The dye was extracted twice with 1 liter of boiling alcohol. The alcohol solution was chilled and filtered. N,N' - ethylene - bis - (p - ethylaminostyrylbenzothiazole ethiodide), a purple dye, was recovered.

Approximately 0.003 part of this dye was added to 100 parts of a gelatino-silver-bromide emulsion containing 5 parts of silver iodide and its spectral sensitivity was determined. Its spectograph is described in Figure 5 of the drawing.

Approximately 0.003 part of the dye in alcoholic solution were admixed with 100 parts of a gelatino-silver-chloride emulsion and its spectral sensitivity was determined. The spectograph is shown in Figure 5a of the drawing.

*Example IX*

One gram of tri-(p-formylphenyl)amine and 2.8 grams of 2-methylbenzothiazole ethiodide were dissolved in 20 ccs. of boiling alcohol and 3 drops of piperidine were added. The solution was refluxed for one-half hour. A red dye came out on cooling. This dye was filtered off and recrystallized twice from alcohol. A black crystalline dye was recovered. This dye, tri-(p-2-benzalmethylbenzothiazole ethiodide)amine when heated in a beaker on a hot plate, appeared to sublime in a purple vapor unchanged.

*Example X*

One gram of tri-(p-formylphenyl)amine and 3.2 grams of 2-methylbenzoselenazole ethiodide were dissolved in 20 ccs. of boiling alcohol and 3 drops of piperidine were added. The mixture was refluxed for one-half hour, a red dye separated out upon cooling. This dye was filtered out, washed with ether, and recrystallized twice from alcohol. A purple dye, namely tri-(p-2-benzalmethylbenzoselenazole ethiodide)amine, was recovered.

*Example XI*

Nine-tenths gram of diethyl-di-(p-formylphenyl) ethylenediamine and 1.5 grams of hexamethylene-bis-(2 - methylbenzothiazole)dibromide were dissolved in 75 ccs. of boiling alcohol, 2 drops of piperidine were added, and the solution was refluxed for 30 minutes. It was cooled, filtered, and extracted with hot alcohol. A soluble, semi-crystalline portion, as well as an insoluble portion, was obtained. A purple polymeric dye was recovered. It had the general formula:

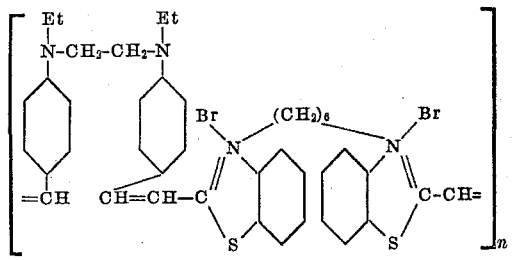

Approximately 0.003 part of the dye in alcoholic solution were admixed with 100 parts of a gelatino-silver-chloride emulsion and its spectral sensitivity was determined. The spectograph is shown in Figure 6a of the drawing.

*Example XII*

0.45 gram of hexamethylene-bis-(2,6-lutidine) dibromide and 0.7 gram of p-dimethylaminobenzaldehyde were dissolved in 50 ccs. of alcohol, 3 drops of piperidine were added, and the mixture was refluxed for 4 hours. After chilling the dye was filtered out and recrystallized twice from alcohol. A deep red solid resulted. The dye had the general formula:

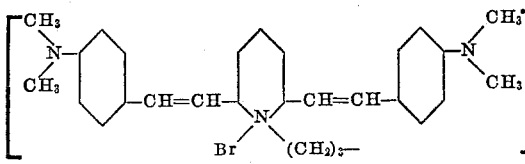

Approximately 0.0025 part of this dye were added to 100 parts of a gelatino-silver-bromide emulsion containing 5 parts of silver iodide and its spectral sensitivity was determined. Its spectograph is described in Figure 7 of the drawing.

*Example XIII*

Two grams of trimethylene-bis-(2,4-lutidinebromide) and 2.9 grams of p-dimethylaminobenzaldehyde were dissolved in 50 ccs. of ethyl alcohol and 3 drops of piperidine were added. The reaction was carried out and the dye recovered in the same manner as described in Example XII. The polymeric dye has the general formula:

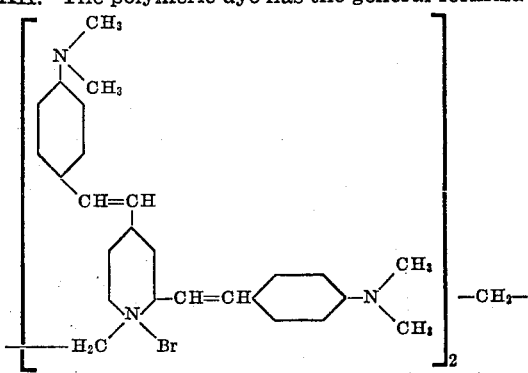

0.003 part of this dye were added to 100 parts of a gelatino-silver-bromide emulsion containing 5 parts of silver iodide and its spectral sensitivity was determined. Its spectograph is described in Figure 8 of the drawing.

The invention is not limited to the specific embodiments set forth in the above examples. On the contrary, a wide variety of bis- or tris-salts can be reacted with various tertiary amino aromatic aldehydes. The bis- or tris-salts may, for example, contain a variety of hydrocarbon radicals between the heterocyclic nitrogen atoms. These radicals are attached to the nitrogen atoms through a non-aromatic carbon atom, that is, through an aliphatic or cycloaliphatic carbon atom. Suitable bases for the preparation of bis, tris, etc. salts include alpha-picoline, gamma-picoline, 2,6-lutidine, 2,4-lutidine, 2,5-lutidine, quinaldine, 2-methylbenzoxazole, 2-methyl-beta-naphthoxazole, 2-methylbenzoselenazole, 2-methyl-beta-naphthothiazole, 1-methyl-alpha-naphthothiazole, 2-methylthiazole, 2-methyloxazole, 2-methyl-6-amino-benzothiazole, 2-methyl-5-aminobenzothiazole, 2,6-dimethyl-5-aminobenzothiazole, 2,4-dimethyl-6-aminobenzothiazole, 2,4,6-trimethyl-7-aminobenzothiazole, 2-methyl-6-diethylaminobenzothiazole, 2-methyl-5-dimethylaminobenzothiazole, 2,4-dimethyl-6-phenylaminobenzothiazole, 2-methyl-6-acetylaminobenzothiazole, 2,4,6-trimethyl-7-acetylaminobenzothiazole, 2,5-dimethyl-4-acetylthiazole, 2,5-dimethyl-4-benzoyl thiazole, 2,5-dimethyl-4-picolinyl thiazole, 2,5-dimethyl-4-thiazole carboxyanilide, 2-methyl-5-(2-pyridyl)-4-thiazole carboxyanilide, ethyl-2,5-dimethyl-4-thiazole carboxylate, 2-methyl-4-furylthiazole, 2-methyl-4-thienyl thiazole, 2-methyl-4-(2-pyridyl)thiazole and the corresponding oxazoles and selenazoles, 2-methyl-5-ethoxy benzthiazole, 2,5,5-trimethyl-benzselenazole, 2-methyl-5:6-dimethoxy-benzthiazole, 2-methyl-5-methoxy-selenazole, 2-methyl-6-ethoxy-benz-thiazole, 5:6-benzthiazole, alpha-methyl-4:5-methylenedioxybenz-thiazole, lepidine, 6-methyl lepidine, 1,3,3-trimethyl-2-methylene indoline, N-ethyl-e-methylene dihydroquinoline, N-ethyl-6-7-dimethyl-2-methylene-dihydroquinoline, N-methyl-6-chloro-2-methylene dihydroquinoline, 1,3-4-trimethyl-2-methylene naphthindoline, 2-methyl thiazoline, 2-methyl selenazoline, 2,6-dimethyl pyridine, 2,6-dipropyl pyridine, 2-methyl-6-ethyl pyridine, 2,4,6-trimethyl pyridine, 2,6-dimethyl-4-phenyl pyridine, 2,6-dimethyl-4-benzylpyridine.

Other polyfunctional hydrocarbon derivatives capable of forming bis, tris, etc. salts with such bases include the following:

A. Polyhalogen substituted alkanes such as methylene dibromide, methylene chloride, propylene dibromide-1,2,butylene dichloride, ethylene and propylene di-iodides, isobutyl dibromide, tri-iodo-triethylmethane, 1.1-dibromoethane, bromoform, acetylene-tetrabromide, hexabromethane, and aromatic substituted alkanes, e. g., benzylidine-dichloride, omega, omega'-xylylenedibromide, omega, omega'-xylylenedichloride, cyclohexane dibromide-1,2,-1,3, and -1,4, 1,3-dibromo-2-hydroxy-propane, etc.

B. Alkyl esters of alkylene and cycloalkylene sulfonic acids, such as methane disulfonic dimethyl ester, ethane alpha-beta disulfonic di-ethyl ester, ethane alpha:alpha disulfonic dimethyl ester, the diethyl ester of ethane alpha:beta disulfonic acid, alpha:beta propane disulfonic diethyl ester, alpha:beta propane disulfonic dimethyl ester, beta-methyl propane alpha:beta disulfonic dimethyl ester, the diethyl esters of (n-hexane-, n-haptane) and n-octane disulfonic acids, methane trisulfonic triethyl ester, ethane alpha:alpha:beta trisulfonic triethyl ester, propane alpha:beta:gamma trisulfonic triethyl ester, etc.

C. Alkyl esters of arylene sulfonic acids such as the diethylester of phenyl disulfonic acid, the dimethyl ester of naphthalene disulfonic acid, the dimethyl ester of diphenyl disulfonic acid, the triethyl ester of phenyl trisulfonic acid.

D. Various alkyl disulfates such as dimethyl alpha:beta ethane disulfate, diethyl alpha:beta ethane disulfate, etc.

E. Esters of sulfonic acids with polyhydric alcohols, e. g., the alkyl, cycloalkyl, and aryl sulfonic acid esters with glycerol and the glycols. Suitable esters include: ethylene di(ethyl sulfonate), ethylene di(p-toluene sulfonate), ethylene di(cyclohexyl sulfonate), p-phenylene di(p-toluene sulfonate), propylene di(p-toluene sulfonate), and hexamethylene di(p-toluene sulfonate).

F. Mixed compounds derived from combining functional aspects of A, B, C, D, and E, such as the alpha bromo, beta ethyl sulfonates of ethane.

It is apparent from the above that the hydrocarbon linking radical may be substituted by various groups which do not form ternary salts, e. g., nitro, primary, secondary and tertiary amino groups; hydroxyl, carbonyl, thiocarbonyl, heterocyclic, and hydrocarbon groups.

In place of the specific tertiary amino aromatic aldehydes described above there may be substituted the following aldehydes: o-methyl-p-diethylaminobenzaldehyde, 4-diethylamino-1-naphthaldehyde, 6-diethylamino-2-naphthaldehyde, p-N-morpholinobenzaldehyde, N,N'-ethylene-bis-(methylaminobenzaldehyde), p,p',p"-triformyltriphenylamine, N,N'-(p,p'-diformyldiphenyl)piperazine, methyl-di-(p-formylphenyl)-amine and other such compounds obtainable from the reactants and procedures of aforesaid application Serial No. 581,939.

The products of this invention are useful in photography, particularly as sensitizing dyes employed to extend the spectral sensitivity of gelatino-silver halide emulsions in the manner known to the art. More specifically, they are particularly useful as sensitizing dyes for use in elements having two emulsion layers with markedly different gradations which are selectively sensitized to different regions of the spectrum. In addition, the compounds are useful in color photography for the preparation of bleaching-out layers in which the dyes are unstabilized to light and can be bleached to form colored pictures by one or more of the processes known to the art. The products are also useful in the preparation of colored filter or screening layers both for photography and other fields of optical science. Because of their amorphous colloidal nature, many of the polymeric products contemplated in the invention are useful in the preparation of foils, films, and coatings wherein they may be mixed with various hydrophilic colloids or similar material, or they may be used alone to produce the desired film or coating element.

In some instances self-supporting films of the novel polymeric dyes can be made. Those types having colloidal properties might be used to replace gelatin and similar substances for photographic elements such as binding agents for light-sensitive salts. Or they may be used as porous membranes, or strata which could be impregnated with light-sensitive salts. They could, furthermore, be used as filter layers, color layers, anti-abrasion layers, backing layers, etc.

The novel polymeric dyes can be used in conjunction with emulsion hardening agents, emulsion desensitizers, surface modifiers, fog-inhibiting agents, etc., and monomeric sensitizing dyes of the cyanine, carbocyanine, merocyanine, neocyanine, styryl, etc., dyes.

One advantage of the invention is that it permits the adsorption of sensitizing dye molecules on silver halide grains in multi-molecular layers of controllable depth and configuration. Of comparable advantage is the fact that the invention provides a series of styrl-type sensitizing dyes which are "non-wandering" or substantially non-diffusible through the hydrophilic colloids such as gelatin which comprise the binding materials of silver halide emulsions. True, non-wandering, sensitizing dyes permit mixed halide emulsions to be prepared having outstanding properties for sharply recording individual spectral bands. A further advantage is that the invention permits the preparation of photographic layers from self binding dye materials which form cohesive, resistant films suitable for light-sensitive silver halide layers, bleachable dye layers or filter layers. A still further advantage is that the invention provides dyes of the styryl class substantive to materials which normally could not be dyed. Another advantage resides in the fact that the invention makes possible the preparation of highly colored films, foils, filaments and plastics in which the dye molecule is an integral part of the synthetic material.

As many apparently widely different embodiments of this invention may be made without departing from the spirit and scope thereof, it is to be understood that the invention is not to be limited except as defined by the appended claims.

What I claim is:

1. The process which comprises condensing a paratertiaryamino aromatic aldehyde containing at least one reactive aldehyde group with a heterocyclic nitrogen quaternary salt containing a heterocyclic nitrogen nucleus of the type usual in cyanine dyes, and having at least one reactive methyl group in a position taken from the group consisting of alpha or gamma positions to the heterocyclic nitrogen atom, at least one of said reactants containing at least two of said reactive groups.

2. The process which comprises condensing a paratertiaryamino aromatic aldehyde containing at least one reactive aldehyde group with a heterocyclic nitrogen quaternary salt containing a heterocyclic nitrogen nucleus of the type usual in cyanine dyes, and having at least one reactive methyl group in a position taken from the group consisting of alpha or gamma positions to the heterocyclic nitrogen atom, at least one of said reactants containing at least two of said reactive groups, by heating in the presence of an acid binding substance.

3. The process which comprises condensing a paratertiaryamino aromatic aldehyde containing at least one reactive aldehyde group with a heterocyclic nitrogen quaternary salt containing a heterocyclic nitrogen nucleus of the type usual in cyanine dyes, and having at least one reactive methyl group in a position taken from the group consisting of alpha or gamma positions to the heterocyclic nitrogen atom, at least one of said reactants containing at least two of said reactive groups, by heating them together in the presence of an organic amine.

4. The process which comprises condensing a paratertiaryamino aromatic mono-aldehyde with a hydrocarbon bis-heterocyclic nitrogen quaternary salt containing two identical heterocyclic nitrogen nuclei of the type usual in cyanine dyes, said salt having a reactive methyl group in each nuclei in one of the positions alpha and gamma to the heterocyclic nitrogen atoms of said nuclei, said nitrogen atoms being attached to a non-aromatic carbon atom of the hydrocarbon radical.

5. The process which comprises condensing a paratertiaryamino aromatic dialdehyde with a hydrocarbon bis-heterocyclic nitrogen quaternary salt containing two identical heterocyclic nitrogen nuclei of the type usual in cyanine dyes, said salt having a reactive methyl group in one of the positions alpha and gamma to the heterocyclic nitrogen atoms of said nuclei, the said nitrogen atoms of the salt being attached to non-aromatic carbon atoms of the hydrocarbon radical.

6. The process which comprises condensing a paratertiaryamino aromatic dialdehyde with a heterocyclic nitrogen quaternary salt containing a single heterocyclic nitrogen nucleus of the type usual in cyanine dyes and having a reactive methyl group in a position taken from the group consisting of alpha and gamma positions to the heterocyclic nitrogen atom thereof.

7. The process which comprises condensing a paratertiaryamino aromatic aldehyde with a heterocyclic nitrogen quaternary salt containing a single heterocyclic nitrogen nucleus of the type usual in cyanine dyes and having a reactive methyl group in a position taken from the group consisting of alpha and gamma positions to the heterocyclic nitrogen atom thereof, by heating in the presence of an acid binding substance.

8. The process which comprises condensing a paratertiaryamino aromatic aldehyde with a heterocyclic nitrogen quaternary salt containing a single heterocyclic nitrogen nucleus of the type usual in cyanine dyes and having a reactive methyl group in a position taken from the group consisting of alpha and gamma positions to the heterocyclic nitrogen atom thereof, by heating in the presence of an organic amine.

9. Bis-styryl dyes of the general formula:

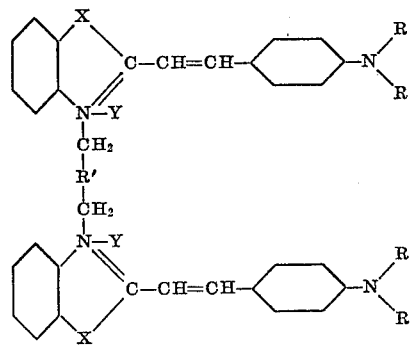

wherein X is a member of the group consisting of oxygen, sulfur and selenium, Y is the negative radical of an acid and R is alkyl and R' is a divalent hydrocarbon radical.

10. A polymeric styryl dye of the formula:

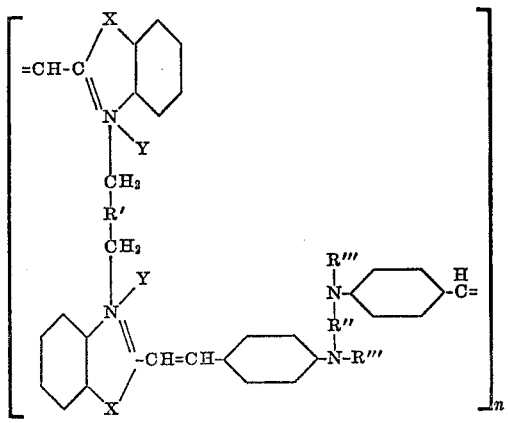

wherein X is a member of the group consisting of oxygen, sulfur and selenium, Y is the negative radical of an acid, R' is a hydrocarbon radical, R'' is a divalent hydrocarbon radical and R''' is an alkyl radical, and $n$ is a positive integer which represents the number of recurring radicals in the polymeric dye.

11. A polymeric dye taken from the group consisting of dyes of the formula:

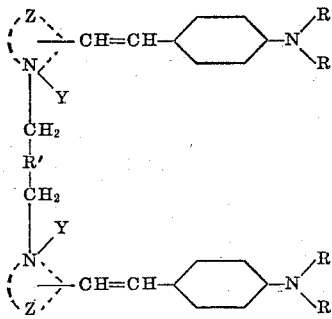

where Z constitutes the atoms necessary to complete a heterocyclic nitrogen nucleus usual in monomeric cyanine dyes, Y is the negative radical of an acid, R is alkyl, and R' is a divalent hydrocarbon radical, the acyclic methinyl radicals being attached to a carbon atom in one of the positions alpha and gamma to the heterocyclic nitrogen atoms which are pentavalent, and dyes of the formula:

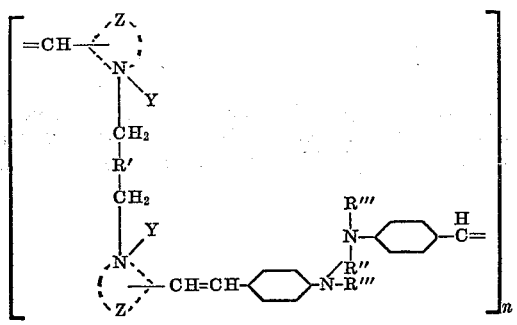

wherein Z, Y, and R' have the same significance as in the first formula, R'' is a divalent hydrocarbon radical, R''' is an alkyl radical and $n$ is a positive integer greater than 1 which represents the number of recurring units in the polymeric dye, the acyclic methinyl radicals being attached to a carbon atom in one of the positions alpha and gamma to the heterocyclic nitrogen atom which is pentavalent.

12. A polymeric dye taken from the group consisting of dyes of the formula:

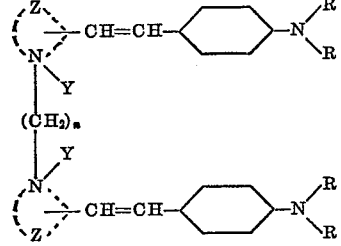

where Z constitutes the atoms necessary to complete a heterocyclic nitrogen nucleus usual in monomeric cyanine dyes, Y is the negative radical of an acid, and R is alkyl, the acyclic methinyl radicals being attached to a carbon atom in one of the positions alpha and gamma to the heterocyclic nitrogen atoms which are pentavalent, and dyes of the formula:

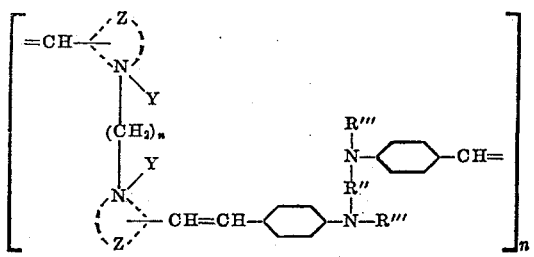

wherein Z and Y have the same significance as in the first formula, R'' is a divalent hydrocarbon radical, R''' is an alkyl radical and $n$ is a positive integer greater than 1 which represents the number of recurring units in the polymeric dye, the acyclic methinyl radicals being attached to a carbon atom in one of the positions alpha and gamma to the heterocyclic nitrogen atom which is pentavalent.

13. Bis-styryl dyes of the formula:

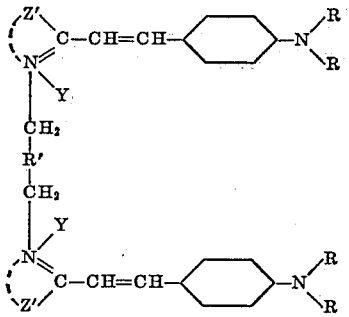

where Z' constitutes the atoms necessary to complete an azole nucleus, Y is the negative radical of an acid, and R' is a divalent hydrocarbon radical, the acyclic methinyl radicals being attached to a carbon atom in one of the positions alpha and gamma to the heterocyclic nitrogen atoms which are pentavalent.

14. The polymeric dye of the formula:

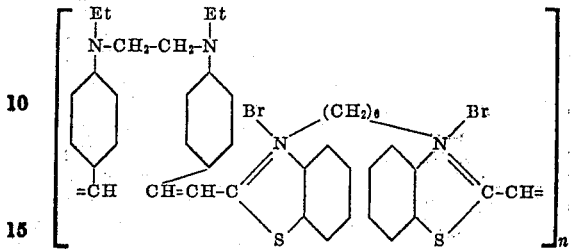

wherein $n$ is a positive integer greater than 1 which represents the number of recurring units in the polymeric dye.

15. The polymeric dye of the formula:

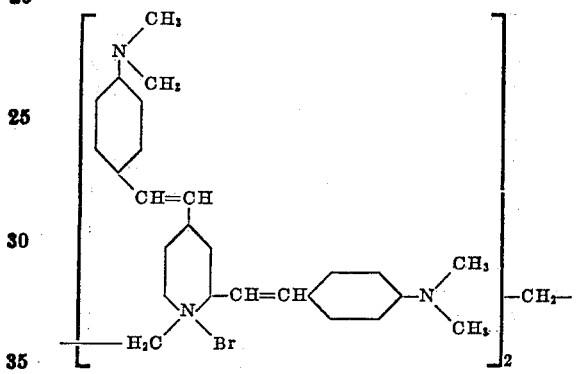

CYRIL D. WILSON.

No references cited.